US012763370B2

(12) United States Patent
Wu et al.

(10) Patent No.: US 12,763,370 B2
(45) Date of Patent: Oct. 13, 2026

(54) ELECTROLYTE FOR LITHIUM SECONDARY BATTERY, SECONDARY BATTERY, AND ELECTRIC DEVICE

(71) Applicant: CONTEMPORARY AMPEREX TECHNOLOGY CO., LIMITED, Ningde (CN)

(72) Inventors: Zeli Wu, Ningde (CN); Qiao Wu, Ningde (CN); Jie Guo, Ningde (CN); Changlong Han, Ningde (CN); Cuiping Zhang, Ningde (CN); Peng Fan, Ningde (CN); Lei Huang, Ningde (CN); Yilin Deng, Ningde (CN); Wenhao Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/315,806

(22) Filed: Sep. 1, 2025

(65) Prior Publication Data

US 2025/0385314 A1 Dec. 18, 2025

Related U.S. Application Data

(63) Continuation of application No. PCT/CN2023/097818, filed on Jun. 1, 2023.

(51) Int. Cl.

*H01M 10/42* (2006.01)
*H01M 4/02* (2006.01)

(Continued)

(52) U.S. Cl.

CPC ....... *H01M 10/0567* (2013.01); *H01M 4/525* (2013.01); *H01M 10/0525* (2013.01);

(Continued)

(58) Field of Classification Search

CPC ............ H01M 10/0567; H01M 4/525; H01M 10/0525; H01M 10/4235; H01M 2004/021; H01M 2004/028; H01M 2300/0025

(Continued)

(56) References Cited

U.S. PATENT DOCUMENTS

2018/0269533 A1* 9/2018 Harayama ......... H01M 10/0525
2021/0399340 A1* 12/2021 Kuwajima ............ C07C 233/09

(Continued)

FOREIGN PATENT DOCUMENTS

CN 106058316 A 10/2016
CN 107369849 A 11/2017

(Continued)

OTHER PUBLICATIONS

International Search Report in the international application No. PCT/CN2023/097818, dated Dec. 25, 2023, 5 pages with English translation.

(Continued)

*Primary Examiner* — Christian Roldan
(74) *Attorney, Agent, or Firm* — K&L Gates LLP

(57) ABSTRACT

The present application discloses an electrolyte for a lithium secondary battery, a secondary battery, and an electric device. The electrolyte for a lithium secondary battery includes a sulfate ester and difluorophosphate ions, a molar ratio of the sulfate ester to the difluorophosphate ions is (0.2 to 30):1, and a molar concentration of the sulfate ester is 0.04 mol/L to 0.16 mol/L.

18 Claims, 2 Drawing Sheets

1

(51) Int. Cl.
*H01M 4/525* (2010.01)
*H01M 10/0525* (2010.01)
*H01M 10/0567* (2010.01)

(52) U.S. Cl.
CPC .. *H01M 10/4235* (2013.01); *H01M 2004/021* (2013.01); *H01M 2004/028* (2013.01); *H01M 2300/0025* (2013.01)

(58) Field of Classification Search
USPC .......................................................... 429/332
See application file for complete search history.

(56) References Cited

U.S. PATENT DOCUMENTS

| | | | | |
|---|---|---|---|---|
| 2022/0123368 A1* | 4/2022 | Liang | ................ | H01M 10/0568 |
| 2023/0024358 A1* | 1/2023 | Kim | ...................... | H01M 4/661 |

FOREIGN PATENT DOCUMENTS

| | | | | | |
|---|---|---|---|---|---|
| CN | 109585924 A | * | 4/2019 | ........ | H01M 10/0525 |
| CN | 110998958 A | | 4/2020 | | |
| CN | 111653827 A | | 9/2020 | | |
| CN | 111653829 A | * | 9/2020 | ........ | H01M 10/0525 |
| CN | 113036222 A | | 6/2021 | | |
| CN | 114361591 A | * | 4/2022 | | |
| JP | 2023510989 A | | 3/2023 | | |
| KR | 20180136655 A | | 12/2018 | | |
| KR | 20200092897 A | | 8/2020 | | |

OTHER PUBLICATIONS

ISA Written Opinion in the international application No. PCT/CN2023/097818, dated Dec. 25, 2023, 8 pages with English translation.

Extended European Search Report, mailed Mar. 26, 2026, for corresponding European Patent Application Serial No. 23938952.1.

Park et al., "Synergistic high-voltage lithium ion battery performance by dual anode and cathode stabilizer additives", Journal of Power Sources 441 (2019) 126668, 8 pages.

* cited by examiner

ELECTROLYTE FOR LITHIUM SECONDARY BATTERY, SECONDARY BATTERY, AND ELECTRIC DEVICE

CROSS-REFERENCE TO RELATED APPLICATIONS

The present disclosure is a continuation of International Application No. PCT/CN2023/097818, filed Jun. 1, 2023, and entitled "ELECTROLYTE FOR LITHIUM SECONDARY BATTERY, SECONDARY BATTERY, AND ELECTRIC DEVICE," which is incorporated herein by reference in its entirety.

TECHNICAL FIELD

The present application relates to the field of secondary battery technologies, and specifically relates to an electrolyte for a lithium secondary battery, a secondary battery, and an electric device.

BACKGROUND

Secondary batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military equipment, and aerospace.

However, existing secondary batteries, after undergoing multiple cycles, storage performance and cycle performance can be significantly reduced, and direct current internal resistance can also be significantly increased.

SUMMARY

In view of the technical problems existing in the background, the present application provides an electrolyte for a lithium secondary battery, aimed at solving the problems of significantly reduced storage performance and cycle performance, as well as significantly increased direct current internal resistance, in secondary batteries containing the electrolyte after multiple cycles.

To achieve the above purpose, a first aspect of the present application provides an electrolyte for a lithium secondary battery, where the electrolyte for a lithium secondary battery includes a sulfate ester and difluorophosphate ions, a molar ratio of the sulfate ester to the difluorophosphate ions is (0.2 to 30):1, and a molar concentration of the sulfate ester is 0.04 mol/L to 0.16 mol/L.

The present application includes at least the following beneficial effects: adding the sulfate ester and difluorophosphate ions to the electrolyte for a lithium secondary battery, with the electrolyte including the sulfate ester and difluorophosphate ions in the above ratio and the sulfate ester at the above concentration, not only enhances the mechanical stability of an interface film, but also alters a solvation structure of the electrolyte, enabling more alkali metal ions to participate in film formation, thereby improving the ionic conductivity of the interface film. Additionally, the thermal stability of the interface film can also be enhanced. Thus, the simultaneous use of the sulfate ester and difluorophosphate ions can reduce the direct current internal resistance of a secondary battery and enhance the storage performance and cycle performance of a battery.

In some embodiments of the present application, a molar ratio of the sulfate ester to the difluorophosphate ions is (2.5 to 10):1. Thus, this configuration can reduce the direct current internal resistance of a secondary battery and enhance the storage performance and cycle performance of the secondary battery.

In some embodiments of the present application, in the electrolyte for a lithium secondary battery, a molar concentration of the sulfate ester is 0.05 mol/L to 0.1 mol/L. Thus, this configuration, with the molar concentration of the sulfate ester within the above range, can enhance the cycle performance of the secondary battery.

In some embodiments of the present application, in the electrolyte for a lithium secondary battery, a molar concentration of the difluorophosphate ions is 0.01 mol/L to 0.04 mol/L, optionally 0.01 mol/L to 0.02 mol/L. Thus, this configuration, with the molar concentration of the difluorophosphate ions within the above range, can reduce the direct current internal resistance of the battery and enhance the storage performance of the secondary battery.

In some embodiments of the present application, the sulfate ester includes at least one of ethylene sulfate, 4-methyl-ethylene sulfate, 4-fluoro-ethylene sulfate, 4-n-propyl-ethylene sulfate, and 4,4'-biethylene sulfate.

In some embodiments of the present application, the difluorophosphate ions are provided by the following substance: $APO_2F_2$, where A includes at least one of Li, Na, K, and H.

In some embodiments of the present application, the electrolyte for a lithium secondary battery further includes a positive electrode film-forming additive. Thus, this configuration allows the positive electrode film-forming additive to participate in forming an interface film on a surface of a positive electrode of the battery, thereby improving the storage performance and cycle performance of the battery.

In some embodiments of the present application, the positive electrode film-forming additive includes at least one of fluoroethylene carbonate and 1,3-propane sultone. Thus, this configuration, with the positive electrode film-forming additive including at least one of the above substances, can participate in forming an interface film on a surface of a positive electrode of the secondary battery, thereby improving the storage performance and cycle performance of the secondary battery.

In some embodiments of the present application, in the electrolyte for a lithium secondary battery, a ratio of a molar amount of the positive electrode film-forming additive to a sum of molar amounts of the sulfate ester and the difluorophosphate ions is (0.05 to 0.6):1, optionally (0.1 to 0.4):1. Thus, this configuration, with the ratio of the molar amount of the positive electrode film-forming additive to the sum of molar amounts of the sulfate ester and the difluorophosphate ions within the above range, can participate in forming the interface film on the surface of the positive electrode of the secondary battery, thereby enhancing the storage performance and cycle performance of the secondary battery.

In some embodiments of the present application, in the electrolyte for a lithium secondary battery, a molar concentration of the positive electrode film-forming additive is 0.01 mol/L to 0.03 mol/L. Thus, this configuration, with the concentration of the positive electrode film-forming additive within the above range, can participate in forming the interface film on the surface of the positive electrode of the secondary battery, thereby improving the storage performance and cycle performance of the secondary battery.

In some embodiments of the present application, the electrolyte for a lithium secondary battery further includes tetrafluoroborate ions. Thus, the tetrafluoroborate ions are compatible with an electrolyte system of the battery, this configuration can participate in forming an interface film on a negative electrode of the secondary battery, thereby reducing the direct current internal resistance of the secondary battery.

In some embodiments of the present application, in the electrolyte for a lithium secondary battery, a ratio of a molar amount of the tetrafluoroborate ions to the sum of molar amounts of the sulfate ester and the difluorophosphate ions is (0.02 to 0.17):1, optionally (0.05 to 0.1):1. Thus, this configuration, with the ratio of the molar amount of the tetrafluoroborate ions to the sum of molar amounts of the sulfate ester and the difluorophosphate ions within the above range, can participate in forming the interface film on the negative electrode of the secondary battery, thereby reducing the direct current internal resistance of the secondary battery and enhancing the storage performance and cycle performance of the secondary battery.

In some embodiments of the present application, in the electrolyte for a lithium secondary battery, a molar concentration of the tetrafluoroborate ions is (0.0025 to 0.02):1, optionally (0.007 to 0.017):1. Thus, this configuration, with the molar concentration of the tetrafluoroborate ions within the above range, can participate in forming the interface film on the negative electrode of the secondary battery, thereby reducing the direct current internal resistance of the secondary battery.

In some embodiments of the present application, the tetrafluoroborate ions are provided by at least one of the following substances: tetrafluoroboric acid, sodium tetrafluoroborate, potassium tetrafluoroborate, and lithium tetrafluoroborate.

In some embodiments of the present application, a water content in the electrolyte for a lithium secondary battery is less than or equal to 20 ppm. Thus, this configuration, with the water content in the electrolyte within the above range, can reduce damage to the interface film caused by water, particularly mitigating damage to the interface film under high voltage, thereby enhancing the storage performance and cycle performance of the secondary battery.

In some embodiments of the present application, a content of HF in the electrolyte for a lithium secondary battery is less than or equal to 150 ppm. Thus, this configuration, with the HF content in the electrolyte within the above range, can reduce damage to the interface film caused by HF, particularly mitigating damage to the interface film under high voltage, thereby enhancing the storage performance and cycle performance of the secondary battery.

A second aspect of the present application provides a secondary battery, where the secondary battery includes the electrolyte for a lithium secondary battery described in the first aspect of the present application. Thus, the secondary battery exhibits low direct current internal resistance and excellent storage performance and cycle performance.

In some embodiments of the present application, the secondary battery includes a positive electrode active material, and the positive electrode active material includes $Li_xNi_{(1-y-z)}Co_yM_zO_{2-b}$, where M includes at least one of Mn, Al, Fe, Ti, Mg, Cr, Ga, Cu, Zn, Nb, and Zr, $0<x\leq1.2$, $0.05\leq y\leq0.8$, $0.01\leq z\leq0.5$, and $0\leq b\leq0.2$.

In some embodiments of the present application, a BET specific surface area of the positive electrode active material is less than or equal to 3 $m^2/g$, optionally, the BET specific surface area of the positive electrode active material is 1 $m^2/g$ to 2.5 $m^2/g$.

A third aspect of the present application provides an electric device, where the electric device includes the secondary battery described in the second aspect.

Additional aspects and advantages of the present application will be given in part in the following description, part of which will become apparent from the following description or be learned from the practice of the embodiments of the present application.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred embodiments and are not intended to limit the present application. Moreover, throughout the accompanying drawings, the same reference signs represent the same components. In the accompanying drawings.

DESCRIPTION OF REFERENCE SIGNS

Figure 1:
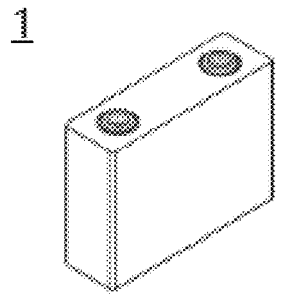
FIG. 1 is a schematic structural diagram of a secondary battery according to an embodiment of the present application.

1: secondary battery; 2: battery module; 3: battery pack; 4: upper box body; and 5: lower box body.

DESCRIPTION OF EMBODIMENTS

The following describes in detail embodiments of technical solutions of the present application. The following embodiments are merely intended for a clearer description of the technical solutions of the present application and therefore are merely used as examples which do not constitute any limitation on the protection scope of the present application.

In this specification, reference to "embodiment" means that specific features, structures, or characteristics described with reference to the embodiment may be included in at least one embodiment of the present application. The word "embodiment" appearing in various positions in the specification does not necessarily refer to the same embodiment or an independent or alternative embodiment that is exclusive of other embodiments. It is explicitly or implicitly understood by persons skilled in the art the embodiments described herein may be combined with other embodiments.

For brevity, this specification specifically discloses only some numerical ranges. However, any lower limit may be combined with any upper limit to form a range not explicitly recorded; any lower limit may be combined with another lower limit to form a range not explicitly recorded; and likewise, any upper limit may be combined with any other upper limit to form a range not explicitly recorded. In addition, each individually disclosed point or individual single numerical value may itself be a lower limit or an upper limit which can be combined with any other point or individual numerical value or combined with another lower limit or upper limit to form a range not expressly recorded.

In the description of some embodiments of the present application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

Unless otherwise defined, all technical and scientific terms used herein shall have the same meanings as commonly understood by persons skilled in the art to which the present application relates. The terms used herein are intended to merely describe the specific embodiments rather than to limit the present application. The terms "include", "comprise", and "have" and any other variations thereof in the specification, claims and brief description of drawings of the present application are intended to cover non-exclusive inclusions.

Secondary batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military equipment, and aerospace. With the continuous expansion of application fields of traction batteries, market demands for traction batteries are also increasing.

During a first charge and discharge process of a secondary battery, an electrode material (for example, a negative electrode active material) reacts with an electrolyte at a solid-liquid phase interface, forming a passivation layer covering a surface of the electrode material. This passivation layer is an interface film with characteristics of a solid electrolyte, being an electronic insulator but an excellent conductor for alkali metal ions, and the alkali metal ions can freely intercalate and deintercalate through the passivation layer. Therefore, this passivation film is referred to as a positive-negative electrode interface film.

However, existing secondary batteries have the following problems: on one hand, with charge and discharge cycles of the secondary battery, interface films at positive and negative electrode interfaces are unstable and easily damaged, and a transmission resistance of alkali metal ions also increases, thereby causing an increase in the direct current impedance of the secondary battery, and deteriorating storage performance and cycle performance; on the other hand, during charge and discharge of a secondary battery, under high temperature and high pressure, a positive electrode active material has strong oxidizing properties, the electrolyte can be oxidized to react to generate a large amount of gas, causing loss of the electrolyte and the positive electrode active material, and affecting the storage performance and cycle performance of the secondary battery.

In the present application, adding a sulfate ester and difluorophosphate ions to the electrolyte, with the electrolyte including the sulfate ester and difluorophosphate ions in the above ratio and the sulfate ester at the above concentration, not only enhances the mechanical stability of an interface film, but also alters a solvation structure of the electrolyte, enabling more alkali metal ions to participate in film formation, thereby improving the ionic conductivity of the interface film. Additionally, the thermal stability of the interface film can also be enhanced. Thus, the combined use of the sulfate ester and difluorophosphate ions can reduce the direct current internal resistance of a battery and enhance the storage performance and cycle performance of the battery. On the other hand, the interface film has thermal stability and mechanical stability, which can reduce a probability of interface film fracture, thereby reducing a reaction between the positive electrode active material and the electrolyte, suppressing gas production in the battery, reducing loss of the electrolyte and the positive electrode active material, and enhancing the storage performance and cycle performance of a secondary battery.

The positive electrode active material disclosed in the embodiments of the present application is suitable for a secondary battery, and the battery disclosed in the embodiments of the present application can be used in an electric device using a battery as a power source or in various energy storage systems using a battery as an energy storage element. The electric device may include, but is not limited to, a mobile phone, a tablet, a laptop computer, an electric toy, an electric bicycle, an electric vehicle, a ship, or a spacecraft. The electric toy may include a fixed or mobile electric toy, for example, a game console, an electric toy car, an electric toy ship, and an electric toy airplane. The spacecraft may include an airplane, a rocket, a space shuttle, a spaceship, and the like.

A first aspect of the present application provides an electrolyte for a lithium secondary battery, where the electrolyte for a lithium secondary battery includes a sulfate ester and difluorophosphate ions, a molar ratio of the sulfate ester to the difluorophosphate ions is (0.2 to 30):1, and a molar concentration of the sulfate ester is 0.04 mol/L to 0.16 mol/L.

The present application includes at least the following beneficial effects: adding the sulfate ester and difluorophosphate ions to the electrolyte, with the electrolyte including the sulfate ester and difluorophosphate ions in the above ratio and the sulfate ester at the above concentration, not only enhances the mechanical stability of the interface film, but also alters a solvation structure of the electrolyte, enabling more alkali metal ions to participate in film formation, thereby improving the ionic conductivity of the interface film. Additionally, the thermal stability of the interface film can also be enhanced. Thus, the combined use of the sulfate ester and difluorophosphate ions can reduce the direct current internal resistance of the secondary battery and improve the storage performance and cycle performance of the battery.

Direct current internal resistance (DCR) refers to the resistance encountered by a current inside a battery cell. After a discharge process of the secondary battery ends, due to the presence of polarization, a battery voltage rebounds. Direct current impedance technology uses a voltage difference between a voltage at the moment before discharge ends and a stable voltage after discharge ends during intermittent discharge of the battery to calculate an internal resistance of the battery.

In some embodiments of the present application, the sulfate ester may include at least one of ethylene sulfate, 4-methyl-ethylene sulfate, 4-fluoro-ethylene sulfate, 4-n-propyl-ethylene sulfate, and 4,4'-biethylene sulfate. Thus, this configuration, by using the above sulfate ester in the electrolyte of the present application, allows participation in forming a positive-negative electrode interface film, making the interface film flexible, adaptable to the expansion and contraction of battery electrode plates during a cycling process, enhancing the mechanical stability of the interface film, thereby improving the cycle performance of the battery. In some other embodiments of the present application, the sulfate ester includes 4,4'-biethylene sulfate, wherein 4,4'-biethylene sulfate is 4,4'-bi(1,3,2-dioxathiolane)-2,2,2',2'-tetraoxide having a structure of

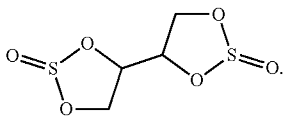 [SMILES: O=S1OCC(C2COS(=O)O2)O1]

In some embodiments of the present application, difluorophosphate ions are provided by the following substance: $APO_2F_2$, where A includes at least one of Li, Na, K, and H. Specifically, the above substance containing difluorophosphate ions can provide difluorophosphate ions, altering the solvation structure of the electrolyte, enabling more alkali metal ions to participate in film formation, thereby improving the ionic conductivity of the interface film, and reducing the transmission resistance of alkali metal ions. Additionally, difluorophosphate ions can participate in forming the positive-negative electrode interface film, enhancing the thermal stability of the interface film, thereby reducing the direct current impedance of the secondary battery while improving the storage performance of the battery.

In some embodiments of the present application, the molar ratio of the sulfate ester to the difluorophosphate ions may be (0.2 to 29):1, (1 to 28):1, (2 to 27):1, (3 to 26):1, (4 to 25):1, (5 to 24):1, (6 to 23):1, (10 to 20):1, (12 to 19):1, (15 to 17):1, and the like. In some other embodiments of the present application, the molar ratio of the sulfate ester to the difluorophosphate ions is (10 to 20):1. Specifically, the molar ratio of the sulfate ester to the difluorophosphate ions within the above range, this can reduce the excessive film formation of the interface film due to an excessive amount of sulfate ester, which leads to deteriorated ion transmission, thereby reducing the direct current internal resistance of the secondary battery. This configuration can also reduce the defects such as insufficient interface film formation and poor stability due to an insufficient amount of sulfate ester, thereby enhancing the storage performance and cycle performance of the secondary battery.

In some embodiments of the present application, in the electrolyte for a lithium secondary battery, the molar concentration of the sulfate ester is 0.04 mol/L to 0.16 mol/L. For example, the molar concentration of the sulfate ester in the electrolyte for a lithium secondary battery may be 0.04 mol/L to 0.15 mol/L, 0.05 mol/L to 0.14 mol/L, 0.06 mol/L to 0.13 mol/L, 0.07 mol/L to 0.12 mol/L, 0.08 mol/L to 0.11 mol/L, 0.09 mol/L to 0.1 mol/L, and the like. Thus, this configuration, with the molar concentration of the sulfate ester within the above range, can reduce a probability of excessive thickness of the positive-negative electrode interface film, thereby reducing the direct current internal resistance of the secondary battery, while being sufficient to enhance the mechanical stability of the interface film, thereby improving the cycle performance of the secondary battery. In some other embodiments of the present application, in the electrolyte for a lithium secondary battery, the molar concentration of the sulfate ester is 0.05 mol/L to 0.1 mol/L.

In some embodiments of the present application, in the electrolyte for a lithium secondary battery, the molar concentration of the difluorophosphate ions is 0.01 mol/L to 0.04 mol/L. For example, the molar concentration of the difluorophosphate ions in the electrolyte may be 0.01 mol/L to 0.03 mol/L, 0.01 mol/L to 0.02 mol/L, 0.02 mol/L to 0.03 mol/L, and the like. Specifically, the molar concentration of the difluorophosphate ions is within the above range, which can mitigate the problem of the increased viscosity of the electrolyte due to the addition of a substance containing difluorophosphate ions, thereby reducing the direct current internal resistance of the secondary battery, while being sufficient to enhance the thermal stability of the interface film, thereby enhancing the storage performance of the secondary battery. In some other embodiments of the present application, in the electrolyte for a lithium secondary battery, the molar concentration of the difluorophosphate ions is 0.01 mol/L to 0.02 mol/L.

In some embodiments of the present application, the electrolyte for a lithium secondary battery may further include a positive electrode film-forming additive. Specifically, the positive electrode film-forming additive can promote the formation of a stable interface film on a surface of a positive electrode of the battery, reducing the direct current impedance of the battery and improving the cycle performance of the secondary battery.

In some embodiments of the present application, the positive electrode film-forming additive may include at least one of fluoroethylene carbonate and 1,3-propane sultone. Specifically, the positive interface film formed by the participation of fluoroethylene carbonate and 1,3-propane sultone has excellent performance. This film can form a dense interface film without increasing impedance, and the interface film can prevent decomposition of the electrolyte, reducing the direct current internal resistance of the battery and improving the storage performance and cycle performance of the secondary battery.

In some embodiments of the present application, in the electrolyte for a lithium secondary battery, a ratio of a molar amount of the positive electrode film-forming additive to a sum of molar amounts of the sulfate ester and the difluorophosphate ions is (0.05 to 0.6):1. For example, the ratio of the molar amount of the positive electrode film-forming additive to the sum of molar amounts of the sulfate ester and the difluorophosphate ions may be (0.05 to 0.55):1, (0.1 to 0.5):1, (0.15 to 0.45):1, (0.2 to 0.4):1, (0.25 to 0.35):1, (0.3 to 0.32):1, and the like. Thus, this configuration, with the ratio of the molar amount of the positive electrode film-forming additive to the sum of molar amounts of the sulfate ester and the difluorophosphate ions in the electrolyte for a lithium secondary battery within the above range, reduces the situation of the increased direct current impedance of the battery due to an excessive amount of the positive electrode film-forming additive affecting the function of the sulfate ester and difluorophosphate ions, and also reduces the situation of inability to participate in positive electrode film formation due to an insufficient amount of the positive electrode film-forming additive, thereby reducing the direct current internal resistance of the secondary battery and improving the storage performance and cycle performance of the secondary battery. In some other embodiments of the present application, in the electrolyte for a lithium secondary battery, the ratio of the molar amount of the positive electrode film-forming additive to the sum of molar amounts of the sulfate ester and the difluorophosphate ions is (0.1 to 0.4):1.

In some embodiments of the present application, in the electrolyte for a lithium secondary battery, a molar concentration of the positive electrode film-forming additive is 0.01 mol/L to 0.03 mol/L. For example, in the electrolyte for a lithium secondary battery, the molar concentration of the positive electrode film-forming additive may be 0.01 mol/L to 0.025 mol/L, 0.013 mol/L to 0.024 mol/L, 0.015 mol/L to 0.023 mol/L, 0.018 mol/L to 0.02 mol/L, and the like. Thus, this configuration, with the concentration of the positive electrode film-forming additive within the above range, reduces the increased direct current impedance of the secondary battery due to an excessive amount of the positive electrode film-forming additive, and also reduces the situation of inability to participate in positive electrode film formation due to an insufficient amount of the positive electrode film-forming additive, thereby reducing the direct current internal resistance of the secondary battery and improving the storage performance and cycle performance of the secondary battery.

In some embodiments of the present application, the electrolyte for a lithium secondary battery further includes tetrafluoroborate ions. The tetrafluoroborate ions are compatible with an electrolyte system for the lithium secondary battery and can participate in forming an interface film on a negative electrode of the battery, facilitating ion channels and reducing the direct current internal resistance of the secondary battery.

In some embodiments of the present application, a substance containing the tetrafluoroborate ions may be at least one of tetrafluoroboric acid, sodium tetrafluoroborate, potassium tetrafluoroborate, and lithium tetrafluoroborate.

In some embodiments of the present application, in the electrolyte for a lithium secondary battery, a ratio of a molar amount of the tetrafluoroborate ions to the sum of molar amounts of the sulfate ester and the difluorophosphate ions is (0.0025 to 0.02):1. For example, the ratio of the molar amount of the tetrafluoroborate ions to the sum of molar amounts of the sulfate ester and the difluorophosphate ions may be (0.0025 to 0.019):1, (0.005 to 0.015):1, (0.008 to 0.014):1, (0.01 to 0.013):1, (0.011 to 0.012):1, and the like. Thus, this configuration, with the ratio of the molar amount of the tetrafluoroborate ions to the sum of molar amounts of the sulfate ester and the difluorophosphate ions in the electrolyte for a lithium secondary battery within the above range, reduces the situation of the increased direct current impedance of the secondary battery due to an excessive amount of tetrafluoroborate ions affecting the function of the sulfate ester and difluorophosphate ions, and also reduces the situation of inability to participate in negative electrode film formation due to an insufficient amount of tetrafluoroborate ions, thereby reducing the direct current internal resistance of the battery and improving the storage performance and cycle performance of the secondary battery. In some other embodiments of the present application, in the electrolyte for a lithium secondary battery, the ratio of the molar amount of the tetrafluoroborate ions to the sum of molar amounts of the sulfate ester and the difluorophosphate ions is (0.007 to 0.017):1.

In some embodiments of the present application, in the electrolyte for a lithium secondary battery, a molar concentration of the tetrafluoroborate ions is 0.0005 mol/L to 0.001 mol/L. For example, the molar concentration of the tetrafluoroborate ions in the electrolyte may be 0.0005 mol/L to 0.0009 mol/L, 0.0006 mol/L to 0.0008 mol/L, 0.0007 mol/L to 0.0008 mol/L, and the like. Thus, this configuration, with the molar concentration of the tetrafluoroborate ions within the above range, reduces deterioration of the direct current impedance of the battery due to an excessive amount of tetrafluoroborate ions, while enabling tetrafluoroborate ions to participate in negative electrode film formation, thereby reducing the direct current internal resistance of the secondary battery and improving the storage performance and cycle performance of the secondary battery. In some other embodiments of the present application, in the electrolyte for a lithium secondary battery, the molar concentration of the tetrafluoroborate ions is 0.0008 mol/L to 0.001 mol/L.

In some embodiments of the present application, a water content in the electrolyte for a lithium secondary battery is less than or equal to 20 ppm. For example, the water content in the electrolyte may be 1 ppm to 19 ppm, 2 ppm to 18 ppm, 3 ppm to 17 ppm, 4 ppm to 16 ppm, 5 ppm to 15 ppm, 6 ppm to 14 ppm, 7 ppm to 13 ppm, 8 ppm to 12 ppm, 9 ppm to 11 ppm, and the like. Thus, this configuration, with the water content in the electrolyte within the above range, can reduce damage to the interface film of the battery caused by water, particularly mitigating damage to the interface film of the battery under high voltage, thereby reducing the direct current internal resistance of the secondary battery and improving the storage performance and cycle performance of the secondary battery.

In some embodiments of the present application, a content of HF in the electrolyte for a lithium secondary battery is less than or equal to 150 ppm. For example, the content of HF in the electrolyte may be 10 ppm to 140 ppm, 20 ppm to 130 ppm, 30 ppm to 120 ppm, 40 ppm to 110 ppm, 50 ppm to 100 ppm, 60 ppm to 90 ppm, 70 ppm to 80 ppm, and the like. Thus, this configuration, with the HF content in the electrolyte within the above range, can reduce damage to the interface film of the battery caused by HF, particularly reducing damage to the interface film of the battery caused by HF under high voltage, thereby reducing the direct current internal resistance of the secondary battery and improving the storage performance and cycle performance of the secondary battery.

It can be understood that control of water content and HF content in the electrolyte for a lithium secondary battery can be achieved by using a molecular sieve to remove water. Specifically, the molecular sieve can be added to the electrolyte for a lithium secondary battery, so that the molecular sieve is in full contact with the electrolyte, water and HF in the electrolyte are adsorbed, and then the molecular sieve and the electrolyte are separated by filtration, centrifugation, or other methods.

It can be understood that the water content and the HF content in the electrolyte can be measured by the following methods:

Testing of Water Content in the Electrolyte for a Lithium Secondary Battery

An electrolyte is injected into a balanced electrolytic cell. After an indicator electrode detects $H_2O$, an electrode oxidizes $I^-$ to $I_2$, and $I_2$ undergoes a quantitative chemical reaction with $H_2O$ to calculate water content; according to section 5.9 Determination of Moisture Content in HG/T4067-2015 Hexafluorophosphate Electrolyte; the quantitative reaction formula of $I_2$ with $H_2O$ is given by: $H_2O+I_2+SO_2+3C_5H_5N=2C_5H_5N\cdot HI+C_5H_5N\cdot SO_3$; and the water content is calculated based on the amount of iodine consumed.

Testing of Hydrofluoric Acid Content in the Electrolyte

In a dry environment, a triethylamine standard solution is used to titrate free acid in the electrolyte, calculated as HF content;

section 5.10 Determination of Free Acid Content in HG/T4067-2015 Lithium Hexafluorophosphate Electrolyte;

$$HF(ppm) = (V2 - V1)/1000 \times C \times 20/m \times 1000000 = (V2 - V1) \times C/m \times 20000;$$

where: 0.01 is a concentration of the standard solution, 0.02 mol/L;

V1 is a volume reading of the titration tube before starting titration, in ml;

V2 is a volume reading of the titration tube at the endpoint after adding an electrolyte sample, in ml;

20 is a molar molecular weight of HF, in g/mol;

m is an amount of the electrolyte weighed, in g; and 20000 is a conversion factor to g/g.

In some embodiments of the present application, the electrolyte for a lithium secondary battery may further include an electrolytic salt and a solvent.

For example, the electrolytic salt may include at least one of lithium hexafluorophosphate ($LiPF_6$), lithium perchlorate ($LiClO_4$), lithium hexafluoroarsenate ($LiAsF_6$), lithium bis(fluorosulfonyl)imide (LiFSI), lithium bis(trifluoromethanesulfonyl)imide (LiTFSI), lithium trifluoromethanesulfonate (LiTFS), lithium difluoro(oxalato)borate (LiDFOB), lithium bis(oxalato)borate (LiBOB), lithium difluorophosphate ($LiPO_2F_2$), lithium difluoro bis(oxalato)phosphate (LiDFOP), and lithium tetrafluoro(oxalato)phosphate (LiTFOP).

For example, the solvent may include at least one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-gamma-butyrolactone (GBL), sulfolane (SF), methyl sulfonyl methane (MSM), ethyl methanesulfonate (EMS), and diethyl sulfone (ESE).

In some embodiments, the electrolyte for a lithium secondary battery may further include an additive. For example, the additive may include an additive capable of improving some performance of the battery, for example, an additive for improving overcharge performance of the secondary battery, an additive for improving high-temperature performance of the battery, or an additive for improving low-temperature performance of the secondary battery.

A second aspect of the present application provides a secondary battery, where the secondary battery includes the electrolyte for a lithium secondary battery described in the first aspect of the present application. Thus, the secondary battery exhibits low direct current internal resistance and excellent storage performance and cycle performance.

A battery refers to a battery that can be charged after being discharged to activate active materials for continuous use.

Generally, a battery includes a positive electrode plate, a negative electrode plate, a separator, and an electrolyte. During charge and discharge process of the battery, active ions (alkali metal ions) are intercalated and deintercalated between the positive electrode plate and the negative electrode plate. The separator is disposed between the positive electrode plate and the negative electrode plate for separation. The electrolyte conducts ions between the positive electrode plate and the negative electrode plate.

In the embodiments of the present application, the battery includes a lithium-ion battery.

[Positive Electrode Plate]

In a battery, a positive electrode plate typically includes a positive electrode current collector and a positive electrode active material layer disposed on the positive electrode current collector, and the positive electrode active material layer includes a positive electrode active material.

The positive electrode current collector may be a common metal foil or a composite current collector (the composite current collector may be formed by providing a metal material on a polymer substrate). For example, the positive electrode current collector may be an aluminum foil.

A specific type of the positive electrode active material is not limited. An active material known in the art that can be used as a positive electrode of a battery can be used, and persons skilled in the art can make selection based on actual needs.

The positive electrode active material may include, but is not limited to, at least one of lithium transition metal oxides, olivine-structured lithium-containing phosphate, and modified compounds thereof. Examples of the lithium transition metal oxide may include but are not limited to at least one of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and modified compounds thereof. Examples of the olivine-structured lithium-containing phosphate may include, but are not limited to, at least one of lithium iron phosphate, composite materials of lithium iron phosphate and carbon, lithium manganese phosphate, composite materials of lithium manganese phosphate and carbon, lithium manganese iron phosphate, composite materials of lithium manganese iron phosphate and carbon, and modified compounds thereof. These materials are all commercially available.

In some embodiments of the present application, the positive electrode active material includes $Li_xNi_{(1-y-z)}Co_yM_zO_{2-b}$, where M includes at least one of Mn, Al, Fe, Ti, Mg, Cr, Ga, Cu, Zn, Nb, and Zr, $0<x\leq1.2$, $0.05\leq y\leq0.8$, $0.01\leq z\leq0.5$, and $0\leq b\leq0.2$.

For example, x may satisfy: $0.2\leq x\leq1.2$, $0.4\leq x\leq1.1$, $0.5\leq x\leq1.0$, $0.6\leq x\leq0.9$, $0.7\leq x\leq0.8$, and the like; y may satisfy: $0.05\leq y\leq0.7$, $0.1\leq y\leq0.6$, $0.2\leq y\leq0.5$, $0.3\leq y\leq0.4$, and the like; z may satisfy: $0.01\leq z\leq0.45$, $0.1\leq z\leq0.4$, $0.2\leq z\leq0.3$, and the like; and b may satisfy: $0\leq b\leq0.15$, $0.02\leq b\leq0.13$, $0.05\leq b\leq0.1$, $0.07\leq b\leq0.09$, and the like.

It should be noted that in the positive electrode plate, the battery, or the electric apparatus, due to processes such as formation and cycling of the battery, lithium ions are consumed, a measured lithium element content x in the positive electrode active material may be less than 1. At the same time, if the positive electrode plate and the negative electrode plate employ a lithium supplementing agent, after processes such as formation and cycling of the battery, a measured lithium element content x in the positive electrode active material may be greater than 1.

Additionally, due to processes such as formation and cycling of the battery, the positive electrode active material may experience lattice oxygen release, causing oxygen loss, and an oxygen element content in the positive electrode active material may be less than 2.

In some embodiments of the present application, a BET specific surface area of the positive electrode active material is less than or equal to 3 $m^2/g$. For example, the BET specific surface area of the positive electrode active material may be 0.3 $m^2/g$ to 3 $m^2/g$, 1 $m^2/g$ to 2.5 $m^2/g$, 1.2 $m^2/g$ to 2.3 $m^2/g$, 1.5 $m^2/g$ to 2 $m^2/g$, and the like. Specifically, with the BET specific surface area of the positive electrode active material within the above range, side reactions of the positive electrode active material under high voltage can be reduced, thereby enhancing the storage performance and cycle performance of the battery. In some other embodiments of the present application, the BET specific surface area of the positive electrode active material is 1 $m^2/g$ to 2.5 $m^2/g$.

It can be understood that the BET specific surface area of the positive electrode active material can be tested by the following method: AMicromeritics multi-station fully automatic specific surface area and porosity analyzer Gemini VII 2390 is used, approximately 7 g of a sample is placed in a 9 cc long tube with a bulb, degassed at 200° C. for 2 h, and then tested in a main instrument to obtain BET (specific surface area) data of the positive electrode active material.

The positive electrode active material layer typically further optionally includes a binder, a conductive agent, and another optional additive.

For example, the conductive agent may include at least one of superconducting carbon, acetylene black, carbon black, Ketjen black, carbon dots, carbon nanotubes, Super P (SP), graphene, and carbon nanofibers.

For example, the binder may include at least one of styrene-butadiene rubber (SBR), water-based acrylic resin (water-based acrylic resin), polyvinylidene fluoride (PVDF), polytetrafluoroethylene (PTFE), ethylene-vinyl acetate copolymer (EVA), polyacrylic acid (PAA), carboxymethyl cellulose (CMC), polyvinyl alcohol (PVA), and polyvinyl butyral (PVB).

[Negative Electrode Plate]

In a battery, a negative electrode plate typically includes a negative electrode current collector and a negative electrode active material layer disposed on the negative electrode current collector, and the negative electrode active material layer includes a negative electrode active material.

The negative electrode current collector may be a common metal foil or a composite current collector (for example, the composite current collector may be formed by providing a metal material on a polymer substrate). For example, the negative electrode current collector may be a copper foil.

A specific type of the negative electrode active material is not limited. An active material known in the art that can be used as a negative electrode of a battery can be used, and persons skilled in the art can make selection based on actual needs. For example, the negative electrode active material may include, but is not limited to, at least one of artificial graphite, natural graphite, hard carbon, soft carbon, a silicon-based material, and a tin-based material. The silicon-based material may include at least one of elemental silicon, a silicon oxide compound (such as silicon monoxide), a silicon-carbon composite, a silicon-nitrogen composite, and a silicon alloy. The tin-based material may include at least one of elemental tin, a tin-oxygen compound, and a tin alloy. These materials are all commercially available.

In some embodiments, the negative electrode active material may include a silicon-based material to further increase the energy density of the battery.

The negative electrode active material layer typically further optionally includes a binder, a conductive agent, and another optional additive.

For example, the conductive agent may include at least one of superconducting carbon, acetylene black, carbon black, Ketjen black, carbon dots, carbon nanotubes, graphene, and carbon nanofibers.

For example, the binder may include at least one of styrene-butadiene rubber (SBR), water-based acrylic resin (water-based acrylic resin), polyvinylidene fluoride (PVDF), polytetrafluoroethylene (PTFE), ethylene-vinyl acetate copolymer (EVA), polyvinyl alcohol (PVA), and polyvinyl butyral (PVB).

For example, other optional additives may include a thickener and a dispersant (for example, sodium carboxymethyl cellulose CMC-Na) and a PTC thermistor material.

As for the separator described above, the present application imposes no particular restrictions, and any known porous separators with electrochemical and mechanical stability can be selected based on actual needs, for example, it may include mono-layer or multi-layer films containing at least one of glass fiber, non-woven fabric, polyethylene, polypropylene, and polyvinylidene fluoride.

The battery is not limited to any particular shape in the embodiments of the present application, and the battery may be cylindrical, rectangular, or of any other shapes. FIG. 1 shows a rectangular battery 1 as an example.

In some embodiments, the battery may include an outer package. The outer package is used for packaging the positive electrode plate, the negative electrode plate, and the electrolyte.

In some embodiments, the outer package may include a housing and a cover plate. The housing may include a base plate and a side plate connected onto the base plate, and the base plate and the side plate enclose an accommodating cavity. The housing has an opening communicating with the accommodating cavity, and the cover plate can cover the opening to close the accommodating cavity.

The positive electrode plate, the negative electrode plate, and the separator may be made into an electrode assembly through winding or lamination. The electrode assembly is packaged into the accommodating cavity. There may be one or more electrode assemblies in the battery, and the quantity may be adjusted as required.

In some embodiments, the outer package of the battery may be a hard shell, for example, a hard plastic shell, an aluminum shell, or a steel shell.

The outer package of the battery may alternatively be a soft package, for example, a soft pouch. A material of the soft package may be plastic, for example, may include at least one of polypropylene (PP), polybutylene terephthalate (PBT), and polybutylene succinate (PBS).

In some embodiments, batteries may be assembled into a battery module, and the battery module may include a plurality of batteries. The specific quantity may be adjusted based on use and capacity of the battery module.

Figure 2:
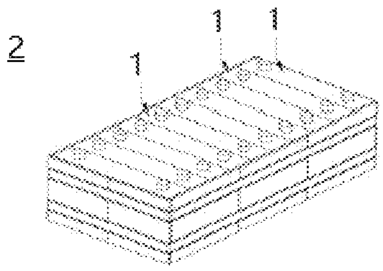
FIG. 2 is a schematic structural diagram of a battery module according to an embodiment of the present application.

FIG. 2 shows a battery module 2 as an example. Referring to FIG. 2, in the battery module 2, a plurality of batteries 1 may be sequentially arranged in a length direction of the battery module 2. Certainly, the batteries may alternatively be arranged in any other manner. Further, the plurality of batteries 1 may be fixed by fasteners.

The battery module 2 may further include an enclosure with an accommodating space, and the plurality of secondary batteries 1 are accommodated in the accommodating space. In some embodiments, the battery module may be further assembled into a battery pack, and a quantity of battery modules included in the battery pack may be adjusted based on application and capacity of the battery pack.

Figure 3:
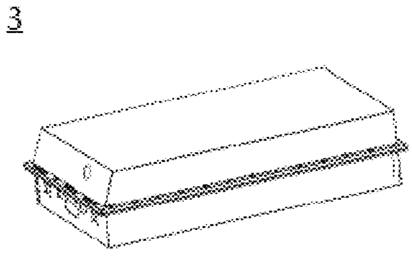
FIG. 3 is a schematic structural diagram of a battery pack according to an embodiment of the present application.
Figure 4:
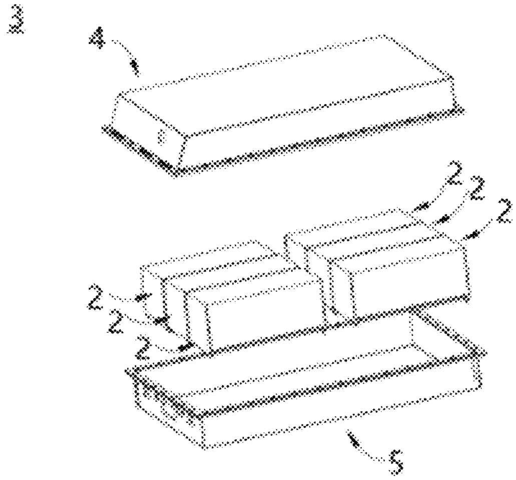
FIG. 4 is an exploded view of FIG. 3.

FIG. 3 and FIG. 4 show a battery pack 3 as an example. Referring to FIG. 3 and FIG. 4, the battery pack 3 may include a battery box and a plurality of battery modules 2 arranged in the battery box. The battery box includes an upper box body 4 and a lower box body 5. The upper box body 4 can cover the lower box body 5 to form an enclosed space for accommodating the battery modules 2. The plurality of battery modules 2 may be arranged in the battery box in any manner.

A third aspect of the present application provides an electric device, and the electric device includes the secondary battery described in the second aspect. Specifically, the secondary battery may be used as a power source for the electric device and may also be used as an energy storage unit of the electric device. The electric device may include, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, or an energy storage system.

Figure 5:
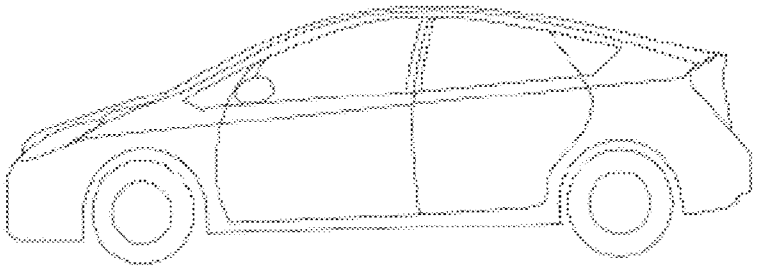
FIG. 5 is a schematic diagram of an electric device using a battery as a power source according to an embodiment of the present application.

FIG. 5 shows an electric device as an example. The electric device includes battery electric vehicle, a hybrid electric vehicle, a plug-in hybrid electric vehicle, or the like.

In another example, an electric device may include a mobile phone, a tablet computer, or a notebook computer. Such electric device is generally required to be light and thin and may use a battery as its power source.

To describe the technical problems solved by the embodiments of the present application, technical solutions, and beneficial effects more clearly, the following further describes the present application in detail with reference to the embodiments and accompanying drawings. Apparently, the described embodiments are only some but not all of these embodiments of the present application. The following description of at least one exemplary example is merely illustrative and definitely is not construed as any limitation on the present application or on use of the present application. All other embodiments obtained by persons of ordinary skill in the art on the basis of the embodiments of the present application without creative efforts shall fall within the protection scope of the present application.

Example 1

Preparation of Secondary Battery Containing Electrolyte for Lithium Secondary Battery 1. Preparation of Electrolyte for Lithium Secondary Battery Ethylene carbonate (EC) and ethyl methyl carbonate (EMC) were mixed at a mass ratio of 30:70 to obtain an organic solvent. Fully dried electrolytic salt $LiPF_6$, a sulfate ester, lithium difluorophosphate, a positive electrode film-forming additive, and lithium tetrafluoroborate were dissolved in the above solvent, and mixed uniformly to obtain an electrolyte.

A molecular sieve was added to the electrolyte for a lithium secondary battery, so that the molecular sieve is in full contact with the electrolyte to adsorb water and HF in the electrolyte. The mixture was then filtered to separate the molecular sieve from the electrolyte to remove water and HF from the electrolyte.

2. Preparation of Secondary Battery

Preparation of Positive Electrode Plate

A positive electrode active material $LiNi_{0.8}Co_{0.1}Mn_{0.1}O_2$ (NCM811), a conductive agent carbon black (Super P), and a binder polyvinylidene fluoride (PVDF) were mixed to uniformity at a mass ratio of 96.2:2.7:1.1 in an appropriate amount of solvent N-methylpyrrolidone (NMP) to obtain a positive electrode slurry. The positive electrode slurry was applied on a positive electrode current collector aluminum foil, followed by processes such as drying, cold pressing, slitting, and cutting to obtain a positive electrode plate.

Preparation of Negative Electrode Plate

A negative electrode active material artificial graphite, a conductive agent carbon black (Super P), a binder styrene-butadiene rubber (SBR), and sodium carboxymethyl cellulose (CMC-Na) were mixed to uniformity at a mass ratio of 96.4:0.7:1.8:1.1 in an appropriate amount of solvent deionized water to obtain a negative electrode slurry. The negative electrode slurry was applied on a negative electrode current collector copper foil, followed by processes including drying, cold pressing, slitting, and cutting, to obtain a negative electrode plate.

A polyethylene film was used as the separator.

The positive electrode plate, the separator, and the negative electrode plate were sequentially stacked so that the separator was located between the positive electrode plate and the negative electrode plate for separation. Then, the resulting stack was wound to form an electrode assembly. The electrode assembly was placed in an outer package and the electrolyte was injected into the battery that was dried, followed by processes of vacuum packaging, standing, formation, and shaping, to obtain a secondary battery.

The secondary batteries of Examples 2 to 39 and Comparative Examples 1 to 2 were the same as Example 1 except for different parameters (see Table 1).

The composition of the electrolyte for a lithium secondary battery in the secondary batteries of Examples 1 to 39 and Comparative Examples 1 to 2 of the present application is shown in Table 1.

TABLE 1

| No. | Molar ratio of sulfate ester to difluoro-phosphate | Concentration of sulfate ester (mol/L) | Concentration of difluoro-phosphate (mol/L) | Positive electrode film-forming additive | Ratio of molar amount of positive electrode film-forming additive to sum of molar amounts of sulfate ester and difluoro-phosphate ions | Concentration of positive electrode film-forming additive (mol/L) | Concentration of tetra-fluoro-borate (mol/L) | Ratio of molar amount of tetra-fluoro-borate ions to sum of molar amounts of sulfate ester and | Positive electrode active material | Specific surface area of positive electrode active material (m2/g) |
|---|---|---|---|---|---|---|---|---|---|---|
| Example 1 | 4:1 | 0.08 | 0.02 | Fluoroethylene carbonate and 1,3-propane sultone | 0.2:1 | 0.02 | 0.0009 | 0.009:1 | $LiNi_{0.4}Co_{0.4}Mn_{0.2}O_2$ | 2 |

TABLE 1-continued

| No. | Molar ratio of sulfate ester to difluoro-phosphate | Concen-tration of sulfate ester (mol/L) | Concen-tration of difluoro-phosphate (mol/L) | Positive electrode film-forming additive | Ratio of molar amount of positive electrode film-forming additive to sum of molar amounts of sulfate ester and difluoro-phosphate ions | Concen-tration of positive electrode film-forming additive (mol/L) | Concen-tration of tetra-fluoro-borate (mol/L) | Ratio of molar amount of tetra-fluoro-borate ions to sum of molar amounts of sulfate ester and | Positive electrode active material | Specific surface area of positive electrode active material (m2/g) |
|---|---|---|---|---|---|---|---|---|---|---|
| Exam-ple 2 | 2:1 | 0.04 | 0.02 | Fluoroethylene carbonate and 1,3-propane sultone | 0.33:1 | 0.02 | 0.0009 | 0.015:1 | $LiNi_{0.4}Co_{0.4}Mn_{0.2}O_2$ | 2 |
| Exam-ple 3 | 8:1 | 0.16 | 0.02 | Fluoroethylene carbonate and 1,3-propane sultone | 0.11:1 | 0.02 | 0.0009 | 0.005:1 | $LiNi_{0.4}Co_{0.4}Mn_{0.2}O_2$ | 2 |
| Exam-ple 4 | 2.5:1 | 0.05 | 0.02 | Fluoroethylene carbonate and 1,3-propane sultone | 0.29:1 | 0.02 | 0.0009 | 0.01:1 | $LiNi_{0.4}Co_{0.4}Mn_{0.2}O_2$ | 2 |
| Exam-ple 5 | 5:1 | 0.1 | 0.02 | Fluoroethylene carbonate and 1,3-propane sultone | 0.17:1 | 0.02 | 0.0009 | 0.0075:1 | $LiNi_{0.4}Co_{0.4}Mn_{0.2}O_2$ | 2 |
| Exam-ple 6 | 16:1 | 0.16 | 0.01 | Fluoroethylene carbonate and 1,3-propane sultone | 0.12:1 | 0.02 | 0.0009 | 0.005:1 | $LiNi_{0.4}Co_{0.4}Mn_{0.2}O_2$ | 2 |
| Exam-ple 7 | 10:1 | 0.1 | 0.01 | Fluoroethylene carbonate and 1,3-propane sultone | 0.18:1 | 0.02 | 0.0009 | 0.008:1 | $LiNi_{0.4}Co_{0.4}Mn_{0.2}O_2$ | 2 |
| Exam-ple 8 | 20:1 | 0.2 | 0.01 | Fluoroethylene carbonate and 1,3-propane sultone | 0.095:1 | 0.02 | 0.0009 | 0.004:1 | $LiNi_{0.4}Co_{0.4}Mn_{0.2}O_2$ | 2 |
| Exam-ple 9 | 30:1 | 0.3 | 0.01 | Fluoroethylene carbonate and 1,3-propane sultone | 0.065:1 | 0.02 | 0.0009 | 0.003:1 | $LiNi_{0.4}Co_{0.4}Mn_{0.2}O_2$ | 2 |
| Exam-ple 10 | 0.2:1 | 0.008 | 0.04 | Fluoroethylene carbonate and 1,3-propane sultone | 0.42:1 | 0.02 | 0.0009 | 0.019:1 | $LiNi_{0.4}Co_{0.4}Mn_{0.2}O_2$ | 2 |
| Exam-ple 11 | 4:1 | 0.08 | 0.02 | / | / | / | / | / | $LiNi_{0.4}Co_{0.4}Mn_{0.2}O_2$ | 2 |
| Exam-ple 12 | 0.2:1 | 0.04 | 0.2 | / | / | / | / | / | $LiNi_{0.4}Co_{0.4}Mn_{0.2}O_2$ | 2 |
| Exam-ple 13 | 30:1 | 0.16 | 0.0053 | / | / | / | / | / | $LiNi_{0.4}Co_{0.4}Mn_{0.2}O_2$ | 2 |
| Exam-ple 14 | 10:1 | 0.1 | 0.01 | / | / | / | / | / | $LiNi_{0.4}Co_{0.4}Mn_{0.2}O_2$ | 2 |
| Exam-ple 15 | 4:1 | 0.08 | 0.02 | Fluoroethylene carbonate and 1,3-propane sultone | 0.2:1 | 0.02 | / | / | $LiNi_{0.4}Co_{0.4}Mn_{0.2}O_2$ | 2 |
| Exam-ple 16 | 4:1 | 0.08 | 0.02 | Fluoroethylene carbonate and 1,3-propane sultone | 0.1:1 | 0.01 | / | / | $LiNi_{0.4}Co_{0.4}Mn_{0.2}O_2$ | 2 |
| Exam-ple 17 | 4:1 | 0.08 | 0.02 | Fluoroethylene carbonate and 1,3-propane sultone | 0.3:1 | 0.03 | / | / | $LiNi_{0.4}Co_{0.4}Mn_{0.2}O_2$ | 2 |
| Exam-ple 18 | 4:1 | 0.08 | 0.02 | / | / | / | 0.0009 | 0.009:1 | $LiNi_{0.4}Co_{0.4}Mn_{0.2}O_2$ | 2 |
| Exam-ple 19 | 4:1 | 0.08 | 0.02 | / | / | / | 0.00025 | 0.0025:1 | $LiNi_{0.4}Co_{0.4}Mn_{0.2}O_2$ | 2 |
| Exam-ple 20 | 4:1 | 0.08 | 0.02 | / | / | / | 0.0007 | 0.007:1 | $LiNi_{0.4}Co_{0.4}Mn_{0.2}O_2$ | 2 |

TABLE 1-continued

| No. | Molar ratio of sulfate ester to difluoro-phosphate | Concen-tration of sulfate ester (mol/L) | Concen-tration of difluoro-phosphate (mol/L) | Positive electrode film-forming additive | Ratio of molar amount of positive electrode film-forming additive to sum of molar amounts of sulfate ester and difluoro-phosphate ions | Concen-tration of positive electrode film-forming additive (mol/L) | Concen-tration of tetra-fluoro-borate (mol/L) | Ratio of molar amount of tetra-fluoro-borate ions to sum of molar amounts of sulfate ester and | Positive electrode active material | Specific surface area of positive electrode active material (m2/g) |
|---|---|---|---|---|---|---|---|---|---|---|
| Exam-ple 21 | 4:1 | 0.08 | 0.02 | / | / | / | 0.0017 | 0.017:1 | $LiNi_{0.4}Co_{0.4}Mn_{0.2}O_2$ | 2 |
| Exam-ple 22 | 2.67:1 | 0.08 | 0.03 | Fluoroethylene carbonate and 1,3-propane sultone | 0.18:1 | 0.02 | 0.0009 | 0.008:1 | $LiNi_{0.4}Co_{0.4}Mn_{0.2}O_2$ | 2 |
| Exam-ple 23 | 4:1 | 0.08 | 0.02 | Fluoroethylene carbonate | 0.2:1 | 0.02 | 0.0009 | 0.009:1 | $LiNi_{0.4}Co_{0.4}Mn_{0.2}O_2$ | 2 |
| Exam-ple 24 | 4:1 | 0.08 | 0.02 | 1,3-propane sultone | 0.2:1 | 0.02 | 0.0009 | 0.009:1 | $LiNi_{0.4}Co_{0.4}Mn_{0.2}O_2$ | 2 |
| Exam-ple 25 | 4:1 | 0.16 | 0.04 | Fluoroethylene carbonate and 1,3-propane sultone | 0.05:1 | 0.01 | 0.0009 | 0.0045:1 | $LiNi_{0.4}Co_{0.4}Mn_{0.2}O_2$ | 2 |
| Exam-ple 26 | 4:1 | 0.04 | 0.01 | Fluoroethylene carbonate and 1,3-propane sultone | 0.6:1 | 0.03 | 0.0009 | 0.018:1 | $LiNi_{0.4}Co_{0.4}Mn_{0.2}O_2$ | 2 |
| Exam-ple 27 | 4:1 | 0.08 | 0.02 | Fluoroethylene carbonate and 1,3-propane sultone | 0.2:1 | 0.02 | 0.0005 | 0.005:1 | $LiNi_{0.4}Co_{0.4}Mn_{0.2}O_2$ | 2 |
| Exam-ple 28 | 4:1 | 0.08 | 0.02 | Fluoroethylene carbonate and 1,3-propane sultone | 0.2:1 | 0.02 | 0.001 | 0.01:1 | $LiNi_{0.4}Co_{0.4}Mn_{0.2}O_2$ | 2 |
| Exam-ple 29 | 4:1 | 0.08 | 0.02 | Fluoroethylene carbonate and 1,3-propane sultone | 0.2:1 | 0.02 | 0.0008 | 0.008:1 | $LiNi_{0.4}Co_{0.4}Mn_{0.2}O_2$ | 2 |
| Exam-ple 30 | 4:1 | 0.08 | 0.02 | Fluoroethylene carbonate and 1,3-propane sultone | 0.2:1 | 0.02 | 0.0006 | 0.006:1 | $LiNi_{0.4}Co_{0.4}Mn_{0.2}O_2$ | 2 |
| Exam-ple 31 | 4:1 | 0.04 | 0.01 | Fluoroethylene carbonate and 1,3-propane sultone | 0.4:1 | 0.02 | 0.001 | 0.02:1 | $LiNi_{0.4}Co_{0.4}Mn_{0.2}O_2$ | 2 |
| Exam-ple 32 | 4:1 | 0.08 | 0.02 | Fluoroethylene carbonate and 1,3-propane sultone | 0.2:1 | 0.02 | 0.0009 | 0.009:1 | $LiNi_{0.1}Co_{0.4}Mn_{0.5}O_2$ | 2 |
| Exam-ple 33 | 4:1 | 0.08 | 0.02 | Fluoroethylene carbonate and 1,3-propane sultone | 0.2:1 | 0.02 | 0.0009 | 0.009:1 | $LiNi_{0.19}Co_{0.8}Mn_{0.01}O_2$ | 2 |
| Exam-ple 34 | 4:1 | 0.08 | 0.02 | Fluoroethylene carbonate and 1,3-propane sultone | 0.2:1 | 0.02 | 0.0009 | 0.009:1 | $LiNi_{0.45}Co_{0.05}Mn_{0.5}O_2$ | 2 |
| Exam-ple 35 | 4:1 | 0.08 | 0.02 | Fluoroethylene carbonate and 1,3-propane sultone | 0.2:1 | 0.02 | 0.0009 | 0.009:1 | $LiNi_{0.4}Co_{0.4}Fe_{0.2}O_2$ | 2 |
| Exam-ple 36 | 4:1 | 0.08 | 0.02 | Fluoroethylene carbonate and 1,3-propane sultone | 0.2:1 | 0.02 | 0.0009 | 0.009:1 | $LiNi_{0.4}Co_{0.4}Al_{0.2}O_2$ | 2 |
| Exam-ple 37 | 4:1 | 0.08 | 0.02 | Fluoroethylene carbonate and 1,3-propane sultone | 0.2:1 | 0.02 | 0.0009 | 0.009:1 | $LiNi_{0.4}Co_{0.4}Mn_{0.2}O_2$ | 1 |

TABLE 1-continued

| No. | Molar ratio of sulfate ester to difluoro-phosphate | Concen-tration of sulfate ester (mol/L) | Concen-tration of difluoro-phosphate (mol/L) | Positive electrode film-forming additive | Ratio of molar amount of positive electrode film-forming additive to sum of molar amounts of sulfate ester and difluoro-phosphate ions | Concen-tration of positive electrode film-forming additive (mol/L) | Concen-tration of tetra-fluoro-borate (mol/L) | Ratio of molar amount of tetra-fluoro-borate ions to sum of molar amounts of sulfate ester and | Positive electrode active material | Specific surface area of positive electrode active material (m2/g) |
|---|---|---|---|---|---|---|---|---|---|---|
| Example 38 | 4:1 | 0.08 | 0.02 | Fluoroethylene carbonate and 1,3-propane sultone | 0.2:1 | 0.02 | 0.0009 | 0.009:1 | $LiNi_{0.4}Co_{0.4}Mn_{0.2}O_2$ | 2.5 |
| Example 39 | 4:1 | 0.08 | 0.02 | Fluoroethylene carbonate and 1,3-propane sultone | 0.2:1 | 0.02 | 0.0009 | 0.009:1 | $LiNi_{0.4}Co_{0.4}Mn_{0.2}O_2$ | 3 |
| Comparative example 1 | 0.1:1 | 0.004 | 0.04 | Fluoroethylene carbonate and 1,3-propane sultone | 0.45:1 | 0.02 | 0.0009 | 0.02:1 | $LiNi_{0.4}Co_{0.4}Mn_{0.2}O_2$ | 2 |
| Comparative example 2 | 32:1 | 0.32 | 0.01 | Fluoroethylene carbonate and 1,3-propane sultone | 0.06:1 | 0.02 | 0.0009 | 0.003:1 | $LiNi_{0.4}Co_{0.4}Mn_{0.2}O_2$ | 2 |

In Table 1, "/" indicates not added, i.e., the addition amount is 0.

Performance Testing of Secondary Battery:

1. Cycle Performance of Secondary Battery

Using Example 1 as an example, at 25° C., the secondary battery was charged to a charge cut-off voltage of 4.2 V at a constant current of 0.5 C, then charged to a current less than or equal to 0.05 C at a constant voltage, left standing for 5 min, then discharged to a discharge cut-off voltage of 2.8 V at a constant current of 0.33 C, and left standing for 5 min. A battery capacity at that time was recorded as $C_0$, representing an initial capacity of the battery. The batteries were subjected to 200 charge and discharge cycles by using the method, and a battery capacity after 200 cycles was recorded as $C_1$, representing the capacity of the battery after 200 cycles $$\text{Cycle capacity retention rate of the secondary battery} = C_1/C_0 \times 100\%$$

The testing process for the capacity of the secondary batteries of Examples 2 to 39 and Comparative Examples 1 to 2 was the same as above.

2. Direct Current Internal Resistance of Secondary Battery

Using Example 1 for example, a secondary battery was charged to 4.15 V at a constant current of 1 C at 25° C., then charged at a constant voltage of 4.15 V until the current was reduced to 0.05 C, then discharged at a constant current of 1 C to 2.5 V, and left standing for 5 min (stabilization time). The next cycle was continued, and for each cycle, the voltage of the battery before the end of discharge and the stabilized voltage of the battery after discharge were recorded. Then, the direct current impedance R was calculated using the following formula: R=ΔU/I (where ΔU was the voltage difference, R was the direct current resistance, and I was the discharge current).

Internal resistance growth rate of the battery=(internal resistance after 200 cycles of the battery−initial internal resistance of the battery)/initial internal resistance of the battery×100%

The testing process for the direct current internal resistance of the secondary batteries of Examples 2 to 39 and Comparative Examples 1 to 2 was the same as above.

3. Storage Performance of Secondary Battery

Using Example 1 for example, at 25° C., the secondary battery was charged to a charge cut-off voltage of 4.2 V at a constant current of 0.5 C, then charged to a current less than or equal to 0.05 C at a constant voltage, left standing for 5 min, then discharged to a discharge cut-off voltage of 2.8 V at a constant current of 0.33 C, and left standing for 5 min. A battery capacity at that time was recorded as $C_0$, representing an initial capacity of the battery.

The testing process for the storage performance of the secondary batteries of Examples 2 to 39 and Comparative Examples 1 to 2 was the same as above.

The performance test results of the secondary batteries of each Example and Comparative Example are shown in Table 2.

TABLE 2

| No. | Initial capacity of secondary battery (mAh/g) | Capacity of secondary battery after 200 cycles (mAh/g) | Capacity retention rate of secondary battery | Initial internal resistance of secondary battery (Ω) | Internal resistance of secondary battery after 200 cycles (Ω) | Internal resistance growth rate |
|---|---|---|---|---|---|---|
| Example 1 | 100.1 | 96.4 | 96.3% | 20.5 | 22.7 | 10.7% |
| Example 2 | 100.3 | 94.6 | 94.3% | 21.6 | 25.3 | 17.1% |
| Example 3 | 100.1 | 96.8 | 96.7% | 20.8 | 22.6 | 8.7% |
| Example 4 | 100 | 97.1 | 97.1% | 21.3 | 22.3 | 4.7% |
| Example 5 | 100.2 | 97.8 | 97.6% | 20.5 | 21.9 | 6.8% |
| Example 6 | 100 | 95.1 | 95.1% | 21.7 | 25.4 | 17.1% |
| Example 7 | 100.2 | 96.5 | 96.3% | 20.6 | 23.1 | 12.1% |
| Example 8 | 99.9 | 94.3 | 94.4% | 21.9 | 25.1 | 14.6% |
| Example 9 | 100.5 | 94 | 93.5% | 21.6 | 25 | 15.7% |
| Example 10 | 100.4 | 94.1 | 93.7% | 21.4 | 25.2 | 17.8% |
| Example 11 | 100 | 94.2 | 94.2% | 22.3 | 25.8 | 15.7% |
| Example 12 | 100.2 | 93.8 | 93.6% | 22.6 | 26.7 | 18.0% |
| Example 13 | 100.1 | 93.5 | 93.4% | 22.1 | 25.6 | 15.9% |
| Example 14 | 99.9 | 95.9 | 96.0% | 22.0 | 25.0 | 13.7% |
| Example 15 | 100.2 | 94.9 | 94.7% | 21.9 | 24.9 | 13.7% |
| Example 16 | 100 | 94.7 | 94.7% | 21.8 | 24.8 | 13.8% |
| Example 17 | 100.2 | 94.9 | 94.7% | 21.7 | 24.6 | 13.4% |
| Example 18 | 100.1 | 94.8 | 94.7% | 21.8 | 24.8 | 13.8% |
| Example 19 | 100 | 94.5 | 94.5% | 21.8 | 24.8 | 13.7% |
| Example 20 | 100.2 | 94.9896 | 94.8% | 21.7 | 24.7 | 13.9% |
| Example 21 | 100.1 | 94.6946 | 94.6% | 21.9 | 24.9 | 13.7% |
| Example 22 | 100 | 93.6 | 93.6% | 22.4 | 26.5 | 18.3% |
| Example 23 | 100.2 | 95.5 | 95.3% | 21.3 | 23.9 | 12.2% |
| Example 24 | 100.1 | 95.3 | 95.2% | 21.5 | 24.1 | 12.1% |
| Example 25 | 100.2 | 95.2 | 95.0% | 21.6 | 24.5 | 13.4% |
| Example 26 | 100.1 | 95.1 | 95.0% | 21.7 | 24.3 | 12.0% |
| Example 27 | 100 | 94.5 | 94.5% | 21 | 23.5 | 11.9% |
| Example 28 | 100.1 | 96.3 | 96.2% | 20.6 | 22.8 | 10.7% |
| Example 29 | 100.2 | 96.3 | 96.1% | 20.4 | 22.9 | 12.3% |
| Example 30 | 99.9 | 95.4 | 95.5% | 20.9 | 23.2 | 11.0% |
| Example 31 | 100.1 | 95.5 | 95.4% | 20.5 | 24.1 | 17.6% |
| Example 32 | 100 | 96.5 | 96.5% | 20.6 | 23.2 | 12.6% |
| Example 33 | 100.3 | 96.1 | 95.8% | 20.7 | 23.5 | 13.5% |
| Example 34 | 99.9 | 95.6 | 95.7% | 20.5 | 23.7 | 15.6% |
| Example 35 | 100.2 | 95.8 | 95.6% | 20.9 | 23.4 | 12.0% |
| Example 36 | 100.4 | 95.9 | 95.5% | 21 | 23.3 | 11.0% |
| Example 37 | 100.2 | 96.3 | 96.1% | 20.7 | 23 | 11.1% |
| Example 38 | 100.3 | 96 | 95.7% | 20.8 | 22.9 | 10.1% |
| Example 39 | 100 | 94.6 | 94.6% | 20.9 | 24.5 | 17.2% |
| Comparative Example 1 | 100.1 | 76.6 | 76.5% | 22.6 | 30.1 | 33.2% |
| Comparative Example 2 | 99.9 | 78.2 | 78.3% | 23.5 | 29.7 | 26.4% |

It can be learned from Table 2 that in Examples 1 to 39 of the present application, adding a sulfate ester and difluorophosphate ions to an electrolyte for a lithium secondary battery, the electrolyte including the sulfate ester and difluorophosphate ions in the above ratio and the sulfate ester at the above concentration, and the simultaneous use of the sulfate ester and difluorophosphate ions can reduce the direct current internal resistance of the battery and enhance the storage performance and cycle performance of the battery. Compared to Examples 1 to 39, the molar ratio of the sulfate ester to difluorophosphate ions in Comparative Examples 1 and 2 is outside the scope of the present application, resulting in significantly reduced storage performance and cycle performance of the battery and significantly increased direct current internal resistance.

In conclusion, it should be noted that the above embodiments are for description of the technical solutions of the present application only rather than for limiting the present application. Although the present application has been described in detail with reference to the above embodiments, persons of ordinary skill in the art should appreciate that they can still make modifications to the technical solutions described in the above embodiments or make equivalent replacements to some or all technical features thereof without departing from the scope of the technical solutions in the embodiments of the present application. All such modifications and equivalent replacements shall fall within the scope of claims and specification of the present application. In particular, as long as there is no structural conflict, the various technical features mentioned in the embodiments can be combined in any manner. The present application is not limited to the specific embodiments disclosed in this specification, but includes all technical solutions falling within the scope of the claims.

What is claimed is:

1. A secondary battery, wherein the secondary battery comprises a positive electrode sheet, a negative electrode sheet, a separator, and an electrolyte, wherein the positive electrode sheet comprises a positive electrode active material, the positive electrode active material comprises a lithium transition metal oxide, the transition metal comprises Ni, Co, and one or more selected from Mn, Al, Fe, Ti, Mg, Cr, Ga, Cu, Zn, Nb, and Zr, wherein the negative electrode sheet comprises a negative electrode active material, the negative electrode active material comprises artificial graphite, the electrolyte comprises a sulfate ester, difluorophosphate ions, a positive electrode film-forming additive, and tetrafluoroborate ions, the sulfate ester comprises at least one of 4-methyl-ethylene sulfate, 4-fluoro-ethylene sulfate, 4-n-propyl-ethylene sulfate, and 4,4'-bi(1,3,2-dioxathiolane)-2,2,2',2'-tetraoxide, the positive electrode film-forming additive comprises fluoroethylene carbonate and 1,3-propane sultone, a molar ratio of the sulfate ester to the difluorophosphate ions is (0.2 to 30):1, a molar concentration of the sulfate ester is 0.04 mol/L to 0.16 mol/L, a molar concentration of the positive electrode film-forming additive is 0.01 mol/L to 0.03 mol/L, a molar concentration of the tetrafluoroborate ions is 0.0005 mol/L to 0.001 mol/L.

2. The secondary battery according to claim 1, wherein the lithium transition metal oxide comprises $Li_xNi_{(1-y-z)}Co_yM_zO_{2-b}$, wherein M comprises at least one of Mn, Al, Fe, Ti, Mg, Cr, Ga, Cu, Zn, Nb, and Zr, $0<x\leq 1.2$, $0.05\leq y\leq 0.8$, $0.01\leq z\leq 0.5$, and $0\leq b\leq 0.2$.

3. The secondary battery according to claim 2, wherein a BET specific surface area of the positive electrode active material is less than or equal to 3 $m^2/g$.

4. An electric device, comprising the secondary battery according to claim 1.

5. An electrolyte for a lithium secondary battery, wherein the electrolyte comprises a sulfate ester, difluorophosphate ions, a positive electrode film-forming additive, and tetrafluoroborate ions, the sulfate ester comprises at least one of 4-methyl-ethylene sulfate, 4-fluoro-ethylene sulfate, 4-n-propyl-ethylene sulfate, and 4,4'-bi(1,3,2-dioxathiolane)-2,2,2',2'-tetraoxide, the positive electrode film-forming additive comprises fluoroethylene carbonate and 1,3-propane sultone, a molar ratio of the sulfate ester to the difluorophosphate ions is (0.2 to 30):1, a molar concentration of the sulfate ester is 0.04 mol/L to 0.16 mol/L, a molar concentration of the positive electrode film-forming additive is 0.01 mol/L to 0.03 mol/L, a molar concentration of the tetrafluoroborate ions is 0.0005 mol/L to 0.001 mol/L.

6. The electrolyte for a lithium secondary battery according to claim 5, wherein the molar ratio of the sulfate ester to the difluorophosphate ions is (2.5 to 10):1.

7. The electrolyte for a lithium secondary battery according to claim 5, wherein the molar concentration of the sulfate ester in the electrolyte for a lithium secondary battery is 0.05 mol/L to 0.1 mol/L.

8. The electrolyte for a lithium secondary battery according to claim 5, wherein a molar concentration of the difluorophosphate ions in the electrolyte for a lithium secondary battery is 0.01 mol/L to 0.04 mol/L.

9. The electrolyte for a lithium secondary battery according to claim 5, wherein the sulfate ester comprises 4-methyl-ethylene sulfate.

10. The electrolyte for a lithium secondary battery according to claim 5, wherein the difluorophosphate ions are provided by the following substance: $APO_2F_2$, wherein A comprises at least one of Li, Na, K, and H.

11. The electrolyte for a lithium secondary battery according to claim 5, wherein a ratio of a molar amount of the positive electrode film-forming additive to a sum of molar amounts of the sulfate ester and the difluorophosphate ions in the electrolyte for a lithium secondary battery is (0.05 to 0.6):1.

12. The electrolyte for a lithium secondary battery according to claim 5, wherein a ratio of a molar amount of the tetrafluoroborate ions to a sum of molar amounts of the sulfate ester and the difluorophosphate ions in the electrolyte for a lithium secondary battery is (0.0025 to 0.02):1.

13. The electrolyte for a lithium secondary battery according to claim 5, wherein the tetrafluoroborate ions are provided by at least one of the following substances: tetrafluoroboric acid, sodium tetrafluoroborate, potassium tetrafluoroborate, and lithium tetrafluoroborate.

14. The electrolyte for a lithium secondary battery according to claim 5, wherein the electrolyte for a lithium secondary battery satisfies at least one of the following conditions:

a water content in the electrolyte for a lithium secondary battery is less than or equal to 20 ppm; and a content of HF in the electrolyte for a lithium secondary battery is less than or equal to 150 ppm.

15. The electrolyte for a lithium secondary battery according to claim 5, wherein the sulfate ester comprises 4,4'-bi(1,3,2-dioxathiolane)-2,2,2',2'-tetraoxide.

16. The electrolyte for a lithium secondary battery according to claim 5, wherein the sulfate ester comprises 4-n-propyl-ethylene sulfate.

17. The electrolyte for a lithium secondary battery according to claim 5, wherein the sulfate ester comprises 4-fluoro-ethylene sulfate.

18. The electrolyte for a lithium secondary battery according to claim 1, wherein the electrolyte is free from N,N-dimethyl-m-phenylenediamine.

* * * * *